(12) United States Patent
Utecht et al.

(10) Patent No.: US 6,251,302 B1
(45) Date of Patent: *Jun. 26, 2001

(54) CHEMICALLY SUBSTITUTED CHROMOPHORES AND FLUOROPHORES OF HIGH SOLUBILITY AND THEIR USE AS FLUID VISUALIZING AGENTS

(75) Inventors: Ronald E. Utecht, Volga, SD (US); David E. Lewis, Eauclaire, WI (US)

(73) Assignee: MicroBioMed Corporation, Dallas, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/007,854

(22) Filed: Jan. 15, 1998

Related U.S. Application Data

(60) Provisional application No. 60/035,509, filed on Jan. 15, 1997.

(51) Int. Cl.$^7$ .............. C10M 133/40; C09K 5/00
(52) U.S. Cl. ............... 252/301.16; 252/301.26; 252/77; 252/78.1; 250/459.1; 250/461.1; 508/261; 73/40; 73/866
(58) Field of Search .............. 250/459.1, 461.1; 508/261; 73/40, 866; 252/77, 78.1, 301.16, 301.26

(56) References Cited

U.S. PATENT DOCUMENTS

| | | |
|---|---|---|
| Re. 35,370 * | 11/1996 | Henry ................. 73/40.7 |
| Re. 35,395 | 12/1996 | Henry ................. 73/40.7 |
| 4,758,366 | 7/1988 | Parekh ................. 252/68 |
| 4,938,063 | 7/1990 | Leighley ............... 73/40.7 |
| 4,992,204 * | 2/1991 | Kluger et al. ........ 252/301.16 |
| 5,235,045 | 8/1993 | Lewis et al. .......... 534/560 |
| 5,279,967 | 1/1994 | Bode ................... 436/56 |
| 5,357,782 | 10/1994 | Henry ................. 73/40.7 |
| 5,421,192 | 6/1995 | Henry ................. 73/40.7 |
| 5,472,878 | 12/1995 | Lewis et al. .......... 436/61 |
| 5,574,213 | 11/1996 | Shanley ............... 73/40.7 |
| 5,650,563 | 7/1997 | Cooper et al. ........ 73/40.7 |
| 5,681,984 | 10/1997 | Cavestri .............. 73/40.7 |
| 5,858,930 * | 1/1999 | Desai et al. .......... 508/261 |
| 5,918,269 * | 6/1999 | Mahaffey, Jr. ........ 73/40.7 |
| 6,150,306 * | 11/2000 | Friswell .............. 508/261 |

FOREIGN PATENT DOCUMENTS

| | | |
|---|---|---|
| 0 437 105 A1 | 12/1990 | (EP) . |
| 529162 * | 3/1993 | (EP) . |

* cited by examiner

Primary Examiner—C. Melissa Koslow
(74) Attorney, Agent, or Firm—Jackson Walker L.L.P.

(57) ABSTRACT

The present invention provides, a 3 or 4-amino-1,8-naphthalimide compound having polyether substituent groups at the 3 or 4-position and the imide position. The polyether groups are linked to a hydrocarbon directly linked at the 3 or 4-amino position and the imide position. The polyether groups render the 3 or 4-amino-1,8-naphthalimide compound sufficiently soluble in a fluid such that visualization of the fluid by color or fluoresence is allowed. In one advantageous embodiment, the 3 or 4-amino-1,8-naphthalimide is obtained from the mixture of 4-chloro-1, 8-naphthalic anhydride with monoamine polyether.

5 Claims, 3 Drawing Sheets n = 5-15

CHEMICALLY SUBSTITUTED CHROMOPHORES AND FLUOROPHORES OF HIGH SOLUBILITY AND THEIR USE AS FLUID VISUALIZING AGENTS

BACKGROUND OF THE INVENTION

This application claims benefit of U.S. Provisional Application Ser. No. 60/035,509 filed on Jan. 15, 1997, and entitled "CHEMICALLY SUBSTITUTED CHROMOPHORES AND FLUOROPHORES OF HIGH SOLUBILITY AND THEIR USE AS FLUID VISUALIZING AGENTS," commonly assigned with the present invention and incorporated herein by reference.

In many applications, visualization of fluids, fluid leakage, and the mode of fluid leakage from a system is difficult due to the clarity of the fluid and the surrounding fluid puddle. Various colored and fluorescent materials have been made as additives which allow the visualization of fluids. Currently available compounds suffer from a lack of suitable solubility in some fluids such as polyethyleneglycol based fluids.

Accordingly, what is needed is a compound that is sufficiently soluble in a fluid such that visualization of the fluid by color or fluoresence is allowed.

SUMMARY OF THE INVENTION

To overcome deficiencies in the prior art, the present invention provides, in one embodiment, a 3 or 4-amino-1, 8-naphthalimide compound having polyether substituent groups at the 4-position and the imide position. The polyether groups are linked to a hydrocarbon directly linked at the 3 or 4-amino position and the imide position. The polyether groups render the 3 or 4-amino-1,8-naphthalimide compound sufficiently soluble in a fluid such that visualization of the fluid by color or fluoresence is allowed. In one advantageous embodiment, the 3 or 4-amino-1,8-naphthalimide is obtained from the mixture of 4-chloro-1, 8-naphthalic anhydride with monoamine polyether.

In another embodiment, the present invention provides an amino-1,8-naphthalimide compound that is soluble in a fluid and that has substituent groups at an imide position and a position distal to said imide position. The substituent groups are linked to a hydrocarbon directly linked at the imide position and the distal position. Additionally, the substituent groups have chemical properties that render the amino-1,8-naphthalimide compound sufficiently soluble in the fluid such that visualization of the fluid by color or fluoresence is allowed.

The present invention, therefore provides in a broad scope, a colored material (chromophore) or a fluorescent material (fluorophore) compound having substituents thereon that renders the material sufficiently soluble in a fluid so that visualization of the fluid by color or fluorescence is allowed. The substituents used are chemically and physically identical or sufficiently similar in properties to the fluid that the chemical and physical forces of salvation lead to sufficient solubilization to allow detection of the dissolved colored or fluorescent material by visual or by light-detector means.

In another embodiment of the present invention, the fluid is a polyalkylene glycol lubricant, and in such embodiments, the polalkylene glycol is preferably polyethyleneglycol. In such embodiments, the 4-chloro-1,8-naphthalic anhydride may comprise about 2% by weight of the 3 or 4-amino-1, 8-naphthalimide resultant product mixture and the monoamine may comprise about 98% by weight of the 3 or 4-amino-1,8-naphthalimide resultant product mixture. In another aspect of this particular embodiment, the mixture is heated to approximately 150° C. for 48 to 72 hours, and yet another aspect of the present invention, the hydrocarbon is a halogenated hydrocarbon.

In another embodiment of the present invention, the 3 or 4-amino-1,8-naphthalimide compound has the following general chemical structure:

where:
Q and Q' are propylene;
Z and Z' are propyl; and
n and n' are between 9 and 10 when R and R' are ethylmethyl; and n and n' are between 5 and 15 when R and R' are methyl; and where n may or may not equal n'.

One aspect of the present invention provides a 3 or 4-amino-1,8-naphthalimide compound that when added to the fluid has a excitation wavelength spectra of equal to or greater than 400 nm.

The foregoing has outlined, rather broadly, preferred and alternative features of the present invention so that those who are skilled in the art may better understand the detailed description of the invention that follows. Additional features of the invention that form the subject of the claims of the invention are described below. Those who are skilled in the art should appreciate that they can readily use the disclosed conception and specific embodiment as a basis for designing or modifying other structures for carrying out the same purposes of the present invention. Those who are skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
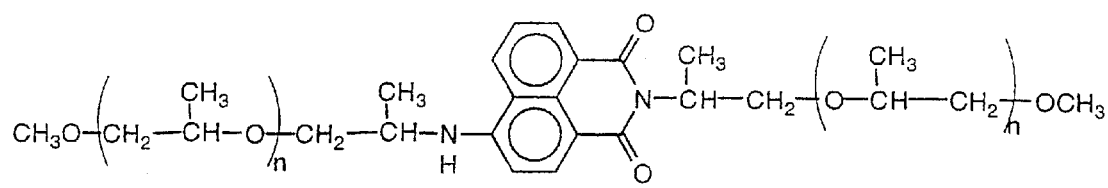
FIG. 1 illustrates the substituted naphthalimide.
Figure 2:
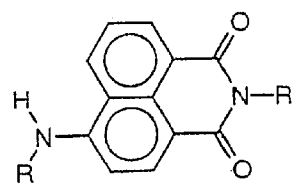
FIG. 2 illustrates the naphthalimide core.
Figure 3:
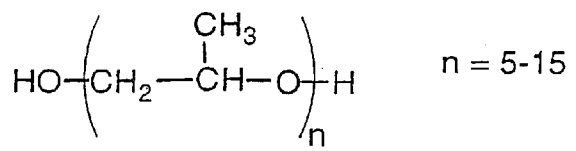
FIG. 3 illustrates the solvent molecular structure.

The present invention may be reduced to practice by the synthesis of the naphthalimide based colored fluorescent molecule MBM Yellow JM-6 with the chemical structure shown in FIG. 1. The colored fluorescent naphthalimide core with the molecular structure shown in FIG. 2 has only limited solubility in polyethyleneglycol solvents when R is hydrocarbon. With the solvent molecular structure shown in FIG. 3, the forces of solvation between the large, bulky naphthalimide core and the linear polyether structure of the polyethyleneglycol molecule are too small to attain sufficient concentration for easy visualization of the naphthalimide color or fluroescence. Synthesis of the substituted naphthalimide shown in FIG. 1 which incorporates the polyether structure of the solvent results in a molecule highly soluble in the polyethyleneglycol.

Figure 4:
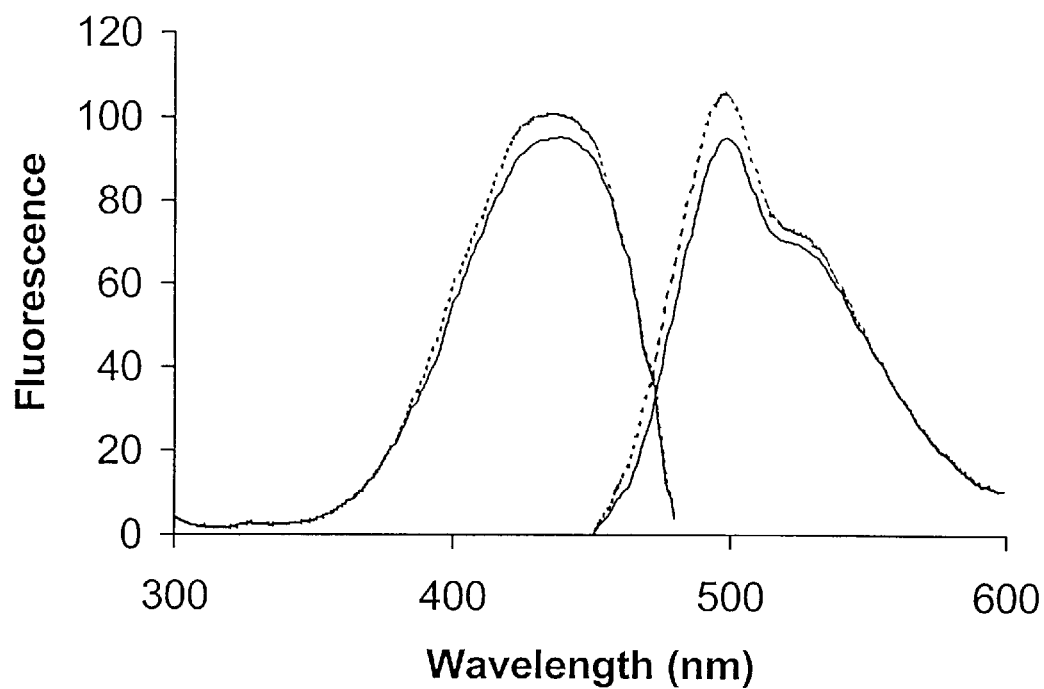
FIG. 4 illustrates the fluorescence spectra of C1 Yellow 143 (solid line) and the MBM Yellow JM6 (dashed line) in PAG lubricant at a concentration of 1 $\mu$M.
Figure 5:
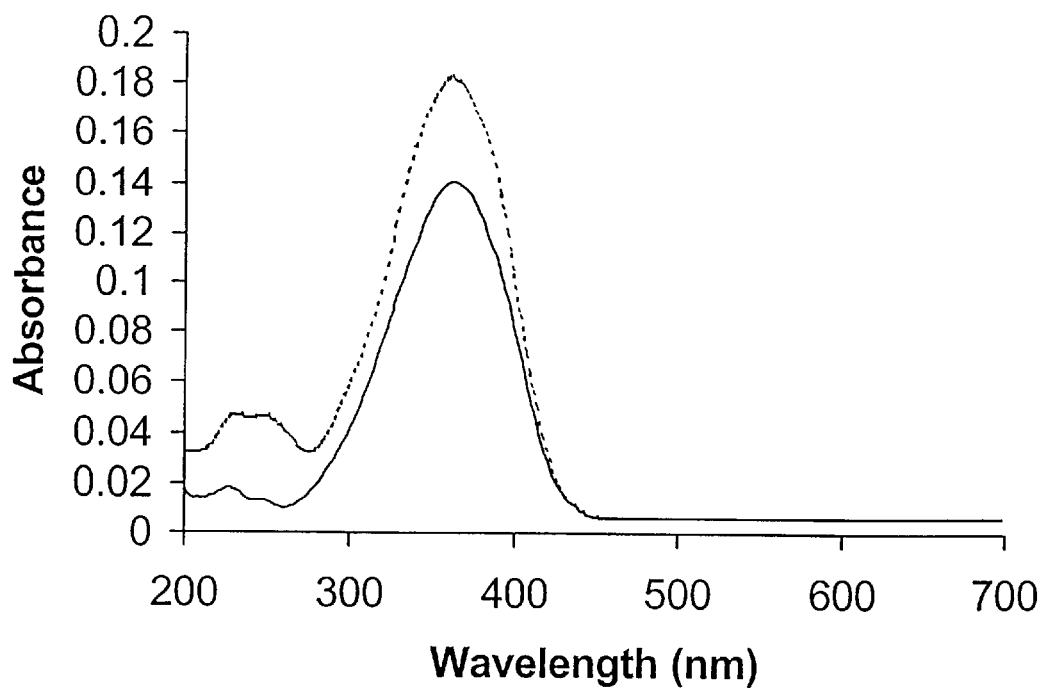
FIG. 5 illustrates the absorbance spectra of C1 Yellow 143 (solid line) and the MBM Yellow JM6 (dashed line) in PAG lubricant at a concentration of 1 $\mu$M.

Incorporation of the polyether substituents does not appreciably alter any of the following: the molecular optical absorption coefficient, the optical absorption spectrum, or the fluorescence excitation spectrum of the 3 or 4-amino naphthalimide, FIGS. 4 and 5.

Figure 6:
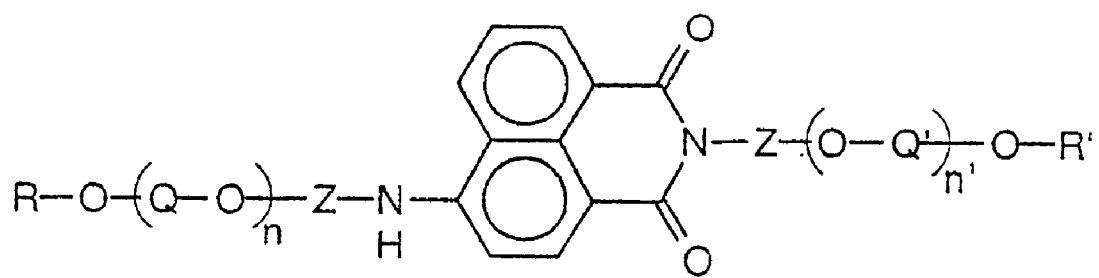
FIG. 6 illustrates one family of structural generalizations of the substituted naphthalamide depicted in FIG. 1.

One family of structural generalizations of the compound MBM Yellow JM-6 (FIG. 1) is the series of compounds shown generally in FIG. 6. Solubility of the naphthalimide core in various selected fluids is adjusted by the selection of the groups R, R', Q, Q', Z, Z', and the numbers n and n', as shown by the following general chemical structure:

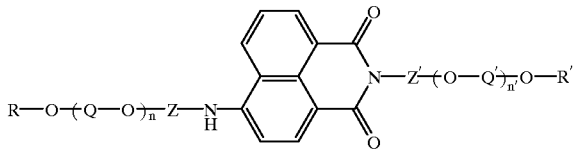

where:
Q and Q' are propylene;
Z and Z' are propyl; and
n and n' are between 9 and 10 when R and R' are ethylmethyl; and n and n' are between 5 and 15 when R and R' are methyl; and where n may or may not equal n'.

Synthesis of MBM Yellow JM-6

MBM Yellow JM-6 was synthesized according to the following procedure:

0.50 grams of 4-chloro-1,8-naphthalic anhydride was added to 20 grams of a monoamine polyether, specifically Jeffamine M-600. The system was then degassed to remove all oxygen and the system placed under a partial pressure of nitrogen to prevent oxygen from entering the system. The reaction mixture was heated to approximately 150° for 48 hours after which the mixture was cooled to room temperature under a nitrogen atmosphere. The excess monoamine polyether was removed by extraction with a minimum amount of water.

The presence of the molecular compound MBM Yellow JM-6 of FIG. 1 at a concentration of 1 $\mu$M in PAG lubricant enabled visualization by the human eye in a lighted room of a thin film of the solvent dye mixture pressed by fingers between two glass microscope slides upon illumination with the output from a 150 W xenon lamp using a 420 nm interference filter having a maximum transmittance of 20% with the visualization away from the direction of reflected and incident exciting beams.

Incorporation of a colored or fluorescent material with sufficiently enhanced solubility in the fluid of interest by use of the invention will allow visualization or detection of the fluid.

For example, a hand-held light emitting a spectrum within the excitation spectrum of the colored or fluorescent material will allow an operator to inspect mechanical system for evidence of lubricant or hydraulic fluid leakage. Alternatively, an electrooptical detector such as a photodiode with suitable filter can be used for continuous surveillance for the presence of a colored or fluorescing fluid.

The results of the reduction to practice of the present invention demonstrate the utility of the invention. The use of one or more chemical substituents of chemical and physical properties sufficiently similar to a fluid to attain sufficient solubility of a colored or fluorescent material to allow visualization or detection of the fluid.

Theoretical organic synthesis and physical organic chemistry considerations show that the polyether substituent structures of the molecule of FIG. 1 can be extended to include the more general naphthalimide compound of FIG. 6.

Similar theoretical considerations show that the concept of the invention can be extended to other colored materials and fluorescent materials and fluid materials.

From the foregoing, it is readily apparent that the present invention provides a 3 or 4-amino-1,8-naphthalimide compound having polyether substituent groups at the 3 or 4-position and the imide position. The polyether groups are linked to a hydrocarbon directly linked at the 3 or 4-amino position and the imide position. The polyether groups render the 3 or 4-amino-1,8-naphthalimide compound sufficiently soluble in a fluid such that visualization of the fluid by color or fluoresence is allowed. In one advantageous embodiment, the 3 or 4-amino-1,8-naphthalimide is obtained from the mixture of 4-chloro-1,8-naphthalic anhydride with monoamine polyether.

Although the present invention has been described in detail, those who are skilled in the art should understand that they can make various changes, substitutions and alterations herein without departing from the spirit and scope of the invention in its broadest form.

What is claimed is:

1. A method of detecting the fluorescent emission spectrum of a detection mixture, comprising the steps of:
   preparing said detection mixture by mixing a fluid said fluid comprising a polyalkylene glycol lubricant, with a 4-amino-1,8-napthalimide compound having the structural formula of: where:

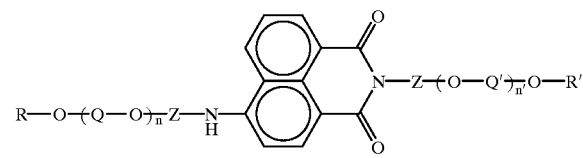

where
Q and Q' are propylene;
Z and Z' are propyl, to form a detection mixture; and
n and n' are between 9 and 10 when R and R' are ethylmethyl; and n and n' are between 5 and 15 when R and R' are methyl; and where n may or may not equal n';
irradiating said detection mixture with a light sufficient to cause said detection mixture to emit a detectable fluorescent emission spectrum; and
detecting said fluorescent emission spectrum emitting from said detection mixture.

2. The method as recited in claim 1, wherein said fluid comprises polyethylene glycol.

3. The method as recited in claim 1, wherein said fluorescence emission spectrum is in a range of about equal to or greater than about 400 nm.

4. The method as recited in claim 1, wherein the 4-amino-1,8-naphthalimide is formed from a resultant mixture of 4-chloro-1,8-naphthalic anhydride with a monoamine polyether reacted at a temperature of about 150° C.

5. The method as recited in claim 4 wherein said 4-chloro-1,8,-naphthalic anhydride comprises about 2% by weight of said resultant mixture and said monoamine polyether compound comprises about 97% by weight of said resultant mixture.

* * * * *